(12) United States Patent
Mirzaee et al.

(10) Patent No.: US 12,063,184 B2
(45) Date of Patent: Aug. 13, 2024

(54) CODEBOOK ASSISTED COVARIANCE TRANSFORMATION IN FREQUENCY DIVISION DUPLEX (FDD) SYSTEMS

(71) Applicant: Telefonaktiebolaget LM Ericsson (publ), Stockholm (SE)

(72) Inventors: Alireza Mirzaee, Ottawa (CA); Rozita Rashtchi, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 430 days.

(21) Appl. No.: 17/431,502

(22) PCT Filed: Apr. 30, 2019

(86) PCT No.: PCT/IB2019/053552
§ 371 (c)(1),
(2) Date: Aug. 17, 2021

(87) PCT Pub. No.: WO2020/222032
PCT Pub. Date: Nov. 5, 2020

(65) Prior Publication Data
US 2022/0150040 A1     May 12, 2022

(51) Int. Cl.
*H04L 5/14*     (2006.01)
*H04B 7/0456*   (2017.01)

(52) U.S. Cl.
CPC ............. *H04L 5/14* (2013.01); *H04B 7/0456* (2013.01)

(58) Field of Classification Search
CPC ................................ H04L 5/14; H04B 7/0456
See application file for complete search history.

(56) References Cited

U.S. PATENT DOCUMENTS

2013/0070827 A1    3/2013   Li et al.
2016/0380734 A1*  12/2016   Wang .................... H04L 5/0048
                                                    370/329

(Continued)

FOREIGN PATENT DOCUMENTS

CN          1379558    * 11/2002
CN          1379558 A    11/2002

OTHER PUBLICATIONS

Chalise, et al., "System Level Performance of UMTS-FDD with Covariance Transformation Based DL Beamforming"; In Global Telecommunications Conference, 2003. GLOBECOM'03. IEEE, vol. 1, pp. 133-137. IEEE 2003, consisting of 5 pages.

(Continued)

*Primary Examiner* — Kent Krueger
(74) *Attorney, Agent, or Firm* — Weisberg I.P. Law, P.A.

(57) ABSTRACT

A network node for a Frequency Division Duplex, FDD, wireless communication network is provided. The network node includes processing circuitry configured to determine a transformation matrix for transforming an uplink codebook to a downlink codebook where the transformation matrix is based at least in part on channel state information, CSI. The processing circuitry is further configured to determine a first uplink codebook based at least in part on uplink signals, determine a first downlink codebook based at least in part on the transformation matrix and the first uplink codebook, and cause transmission of downlink signals to a wireless device based at least in part on the first downlink codebook.

18 Claims, 8 Drawing Sheets

(56) References Cited

U.S. PATENT DOCUMENTS

2018/0227772 A1    8/2018   Yu et al.
2018/0262246 A1*   9/2018   Faxér .................. H04B 7/0452

OTHER PUBLICATIONS

Chalise, et al., "Robust Uplink to Downlink Spatial Covariance Matrix Transformation for Downlink Beamforming"; IEEE Communication Society, pp. 3010-3014, 2004, consisting of 5 pages.
Caire, et al.; "Multiuser MIMO Achievable Rates with Downlink Training and Channel State Feedback"; IEEE Transactions on Information Theory, vol. 56, No. 6, pp. 2845-2866, Jun. 2010, consisting of 22 pages.
Fang et al.; "Low Rank Covariance-Assisted Downlink Training and Channel Estimation for FDD Massive MIMO Systems"; IEEE Transactions on Wireless Communications, vol. 16, No. 3, pp. 1935-1947, Mar. 2017, consisting of 13 pages.
International Search Report and Written Opinion dated Dec. 5, 2019 issued in PCT Application No. PCT/IB2019/053552, consisting of 14 pages.

* cited by examiner

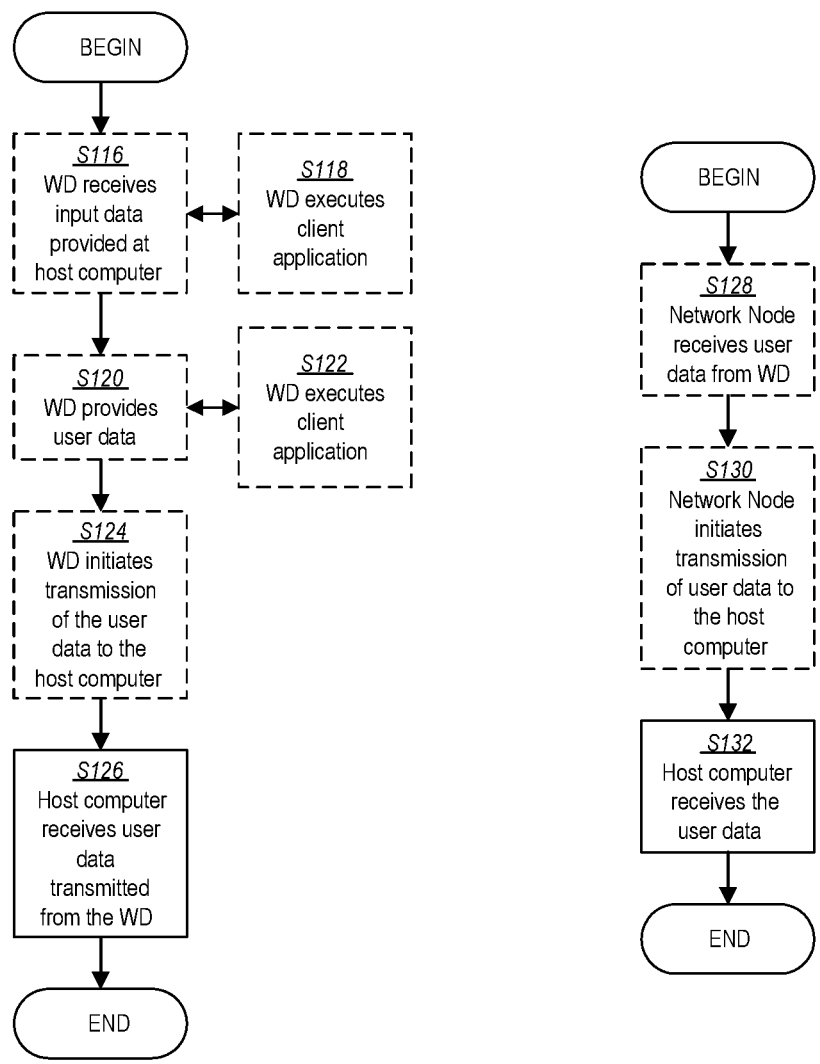

CODEBOOK ASSISTED COVARIANCE TRANSFORMATION IN FREQUENCY DIVISION DUPLEX (FDD) SYSTEMS

CROSS-REFERENCE TO RELATED APPLICATION

This application is a Submission Under 35 U.S.C. § 371 for U.S. National Stage Patent Application of International Application Number: PCT/IB2019/053552, filed Apr. 30, 2019 entitled "CODEBOOK ASSISTED COVARIANCE TRANSFORMATION IN FREQUENCY DIVISION DUPLEX (FDD) SYSTEMS," the entirety of which is incorporated herein by reference.

TECHNICAL FIELD

Wireless communication and in particular, using channel state information for downlink configuration in Frequency Division Duplex (FDD) wireless communication systems.

BACKGROUND

In Frequency Division Duplex (FDD) wireless communication systems, the communication frequencies used for respective uplink (UL) and downlink (DL) communications are different. Reciprocity-based algorithms on the other hand, rely on the use of uplink channel information for downlink purposes. However, due to existence of duplex gap in FDD systems caused, for example, at least in part on the use of different frequencies, the uplink information may not be directly applied to the downlink for downlink purposes/applications. FDD systems may attempt to compensate for this duplex gap.

For example, assuming that one or more channel characteristic are preserved in the UL (from wireless device to network node) and the DL (from network node to wireless device) directions, e.g., AoA and AoD, scatter locations, etc., the phase of each incoming/outgoing ray/beam to the network node is calculated based on UL/DL frequencies, in UL and DL directions, respectively. In other words, a steering vector of a single ray in UL and DL are as follows:

$$A_{UL}(\theta_i) = \begin{bmatrix} 1 \\ e^{-j2\pi d/\lambda_{UL} \sin\theta_i} \\ e^{-j2\pi 2d/\lambda_{UL} \sin\theta_i} \\ \vdots \\ e^{-j2\pi(N-1)d/\lambda_{UL} \sin\theta_i} \end{bmatrix},$$

$$A_{DL}(\theta_i) = \begin{bmatrix} 1 \\ e^{-j2\pi d/\lambda_{DL} \sin\theta_i} \\ e^{-j2\pi 2d/\lambda_{DL} \sin\theta_i} \\ \vdots \\ e^{-j2\pi(N-1)d/\lambda_{DL} \sin\theta_i} \end{bmatrix}$$

where N is the number of antennas, $\theta_i$ is the AoA (AoD) in UL (DL) directions, d is the spacing between antennas in meters and $\lambda_{UL}(\lambda_{DL})$ is the UL(DL) wavelength. The received signal at the network node may consist of several rays due to multipath effect of propagation environment, i.e., $$y(t) = \sum_{i=1}^{Q} H_i A_{UL}(\theta_i) x(t) + n(t)$$

where $H_i$ is the channel transfer function, x(t) and n(t) are the transmitted signal and noise, respectively, and Q is the number of rays.

To compute the DL steering vector in the UL, the phase of each single ray in the summation may need to be transferred based on the DL frequency. However, since extracting all of the AoAs from the received signal is computationally prohibitive, a transformation matrix to transfer the covariance matrix (that includes all information about the UL channel: $R = \sum_{i=1}^{Q} |H_i|^2 A_{UL}(\theta_i) A_{UL}^H(\theta_i)$) from the UL to the DL may be needed. There are two existing processes for transferring the covariance matrix. Each of these processes have problems as follows:

Existing process 1—Offline methods are used to design the transformation matrix based on a predefined set of AoAs, e.g., MMSE approach. However, unless the design environment is very similar to real world environment, existing process 1 usually does not perform well in real world systems.

Existing process 2—Online methods are used to find a set of AoAs in the UL and to compute the corresponding DL covariance, e.g., MVDR method. Existing process 2 may involve eigen-value decomposition and disadvantageously has high complexity.

SUMMARY

In FDD systems, since the UL and DL channels are not reciprocal, some systems may rely on DL information from the wireless device, such as reported codebook from the wireless device, for beamforming. However, it may be advantageous to also utilize the UL channel information for downlink transmission DL even if the UL and DL channels are not reciprocal. For example, the UL channel information could be used to optimize the beamforming in the DL and/or adding an extra dimension to the DL precoder. However, to utilize the UL information in the DL, some adjustment to or transformation of the UL information may be needed to compensate for the duplex gap associated with the non-reciprocal UL and DL channels.

In codebook-based transmission modes, the wireless device reported codebook is available at the network node such as via a Channel State Information (CSI) report, i.e., via channel state information that includes and/or indicates codebook information, for example. The codebook reported by the wireless device may by measured based on the DL channel. As such, the codebook reported by the wireless device may be a reference for any UL estimated codebook that may be used to compensate for the duplex gap. One or more embodiments described herein may be an online method with affordable cost, i.e., computation resources used for the online method are below a threshold.

Two examples of compensating for the duplex gap in accordance with the disclosure are as follows:

Example 1. In two dimensional (2D) antennas systems, since codebooks may be designed for array antennas of one dimension in Third Generation Partnership Project (3GPP) standard, the network node may perform an estimate of the best beam in the same direction (e.g., horizontal or vertical direction) from the uplink channel and then determine a transformation to convert/transform the uplink estimated beam to the actual reported beam. In the second dimension/ direction, the network node can estimate the beam in the UL and use the transformation, i.e., transformation matrix, to convert the estimated beam in the UL to the DL. In one or more embodiments, in a downlink context, "best beam" refers to a beam used and/or received by the wireless device 22 on which the wireless device 22 may achieve a highest throughput compared to other beams. In one or more embodiments, in an uplink context, "best beam" refers to the beam received and/or detected by the network node 16 which is closest to the beam direction transmitted from the wireless device 22. In FDD, the best beam in the DL and UL may not be the same, and one or more embodiments, described herein, allows for determining the best beam in the DL from the best beam in the UL.

Example 2. In codebook-based transmission modes, the wireless device may report codebook that is based on a number of Channel State Information-Reference Signal (CSI-RS) ports. In scenarios where the number of antennas (array antenna) used by the network node is greater than the number of CSI-RS ports, there is potential for the network node to extract information from the UL and use this extracted information to optimize the network node's DL beamforming. The optimizing of DL beamforming may be beneficial when there exist UL traffic so that the UL information is available more frequently than the CSI report (which may be received periodically at the network node), containing codebook information. This may be the situation when there are high mobility wireless devices or fast fading channels. In reciprocal channels, such as TDD based channels, the UL information can be directly used in DL directions, however in FDD systems where the channels are not reciprocal, there is a need for transforming the UL information to compensate for the duplex gap. In one or more embodiments, whenever a CSI report available and/or received by the network node, the network node may estimate the best beam in the UL and may receive an indication of the best beam from the Precoder Matrix Indicator (PMI) report. Using the estimate and received indication as inputs, the network node may determine a transformation matrix and may use and/or apply the transformation matrix for DL transmissions until the next available CSI report.

Some embodiments advantageously provide a method, nodes and system for using control information for downlink configuration in Frequency Division Duplex (FDD) systems.

According to one aspect of the disclosure, a network node for a Frequency Division Duplex, FDD, wireless communication network is provided. The network node includes processing circuitry configured to determine a transformation matrix for transforming an uplink codebook to a downlink codebook where the transformation matrix is based at least in part on channel state information, CSI, i.e., CSI received from the wireless device. The processing circuitry is further configured to determine a first uplink codebook based at least in part on uplink signals, i.e., uplink signals received from the wireless device, determine a first downlink codebook based at least in part on the transformation matrix and the first uplink codebook, and cause transmission of downlink signals to the wireless device based at least in part on the first downlink codebook.

According to one or more embodiments of this aspect, the CSI includes a second downlink codebook indicative of a downlink channel measured by a wireless device. According to one or more embodiments of this aspect, the processing circuitry is further configured to determine a multi-dimensional downlink precoder based at least in part on the second downlink codebook included in the CSI and the first downlink codebook. The transmission of downlink signals to the wireless device is based at least in part on the multi-dimensional downlink precoder. According to one or more embodiments of this aspect, the processing circuitry is further configured to determine a second uplink codebook based at least in part on the uplink signals where the first uplink codebook corresponds to a first beam direction and the second uplink codebook corresponding to a second beam direction different from the first beam direction. The transformation matrix is based at least in part on the second uplink codebook.

According to one or more embodiments of this aspect, the transformation matrix at least in part compensates for a duplex gap between an uplink channel and a downlink channel in the FDD wireless communication network. According to one or more embodiments of this aspect, the causing of transmission of downlink signals to the wireless device includes performing downlink beamforming based at least in part on the first downlink codebook.

According to one or more embodiments of this aspect, the CSI includes a precoding matrix indicator, PMI, where the determination of the transformation matrix is based at least in part on the PMI. According to one or more embodiments of this aspect, the PMI in a first beam direction is used for determining the first downlink codebook in a second beam direction different from the first beam direction. According to one or more embodiments of this aspect, the transformation matrix is defined as $$T = \frac{W_{PMI} W_{UL}^H}{W_{UL} W_{UL}^H}$$

where $W_{PMI}$ is a codebook based at least in part on downlink reference signals, $W_{UL}$ is an estimated beam based at least in part on uplink signals, and $W_{UL}^H$ is a Hermitian of a matrix of $W_{UL}$. According to one or more embodiments of this aspect, the transformation matrix is updated if a precoding matrix indicator, PMI, is included in the CSI.

According to another aspect of the disclosure, a method for a network node for a Frequency Division Duplex, FDD, wireless communication network is provided. A transformation matrix for transforming an uplink codebook to a downlink codebook is determined. The transformation matrix is based at least in part on channel state information, CSI, i.e., CSI received from a wireless device. A first uplink codebook is determined based at least in part on uplink signals such as uplink signals received from the wireless device. A first downlink codebook is determined based at least in part on the transformation matrix and the first uplink codebook. Transmission of downlink signals to the wireless device is caused based at least in part on the first downlink codebook.

According to one or more embodiments of this aspect, the CSI includes a second downlink codebook indicative of a downlink channel measured by a wireless device. According to one or more embodiments of this aspect, a multi-dimensional downlink precoder is determined based at least in part on the second downlink codebook included in the CSI and the first downlink codebook. The transmission of downlink signals to the wireless device is based at least in part on the multi-dimensional downlink precoder. According to one or more embodiments of this aspect, a second uplink codebook is determined based at least in part on the uplink signals where the first uplink codebook corresponds to a first beam direction and the second uplink codebook corresponds to a second beam direction different from the first beam direction. The transformation matrix is based at least in part on the second uplink codebook. According to one or more embodiments of this aspect, the transformation matrix at least in part compensates for a duplex gap between an uplink channel and a downlink channel in the FDD wireless communication network. According to one or more embodiments of this aspect, the causing of transmission of downlink signals to the wireless device includes performing downlink beamforming based at least in part on the first downlink codebook.

According to one or more embodiments of this aspect, the CSI includes a precoding matrix indicator, PMI, where the determination of the transformation matrix is based at least in part on the PMI. According to one or more embodiments of this aspect, the PMI in a first beam direction is used for determining the first downlink codebook in a second beam direction different from the first beam direction. According to one or more embodiments of this aspect, the transformation matrix is defined as:

$$T = \frac{W_{PMI} W_{UL}^H}{W_{UL} W_{UL}^H}$$

where $W_{PMI}$ is a codebook based at least in part on downlink reference signals, $W_{UL}$ is an estimated beam based at least in part on uplink signals, and $W_{UL}^H$ is a Hermitian of a matrix of $W_{UL}$. According to one or more embodiments of this aspect, the transformation matrix is updated if a precoding matrix indicator, PMI, is included in the CSI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
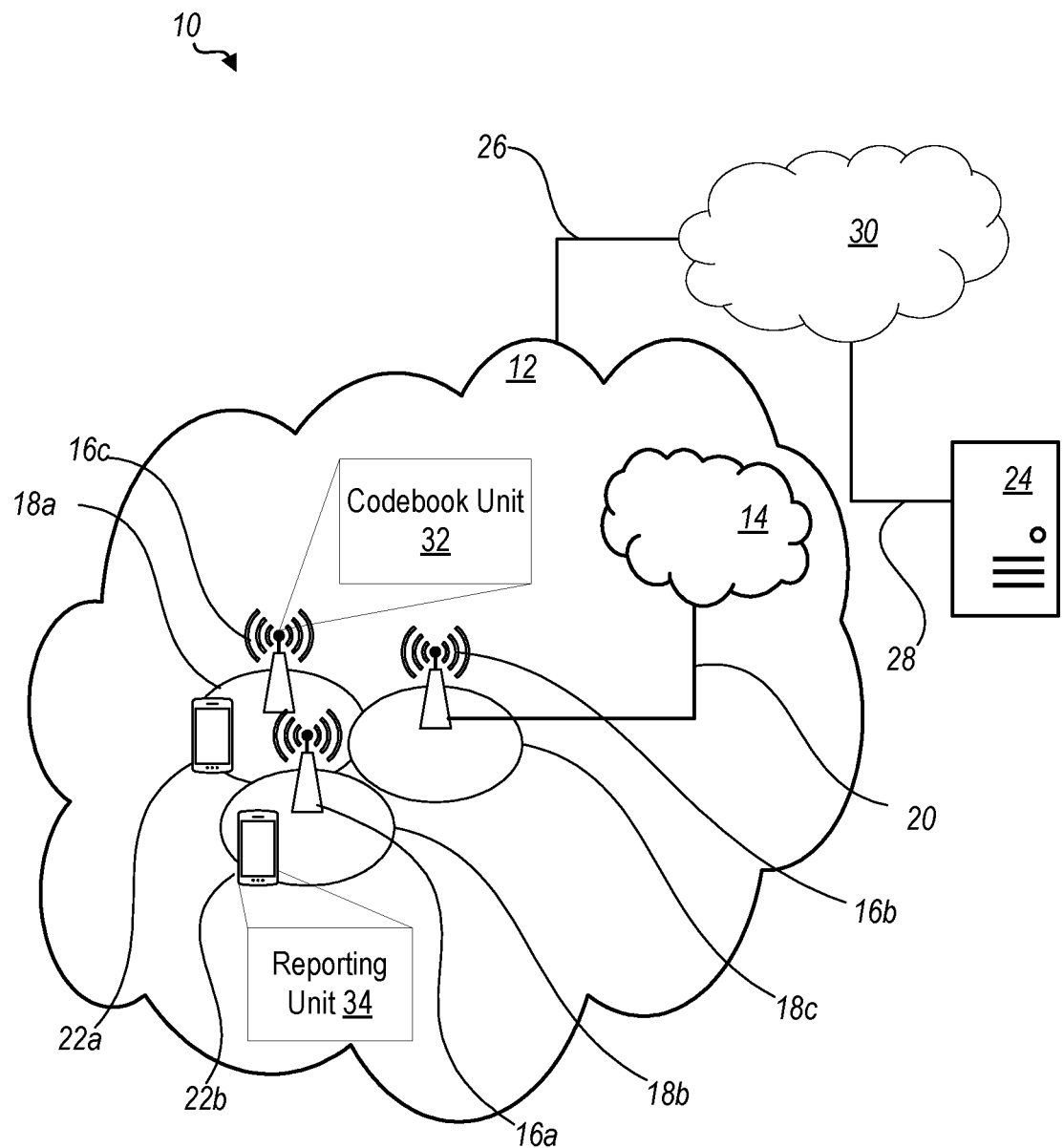
FIG. 1 is a schematic diagram of an exemplary network architecture illustrating a communication system connected via an intermediate network to a host computer according to the principles in the present disclosure.

One or more embodiments of the disclosure provide for the use of reciprocity-based algorithms in FDD systems that may lack reciprocity between UL and DL channels/transmissions. In particular, in codebook-based transmission modes, a codebook report from the wireless device may be available at, i.e., received by, the network node; however, the codebook report may provide minimal information. In reciprocal channels such as TDD channels in TDD systems, the network node can obtain more information from the uplink channel and apply this information directly to DL channel. However, direct application of UL information to the DL channel is not applicable in FDD systems, and the UL covariance may need to be transformed to the DL covariance, i.e., the UL information may need to be transformed to DL information and then applied in the DL channel. One or more embodiments of the disclosure advantageously provide for such a transformation using the codebook information, i.e., reported codebook or codebook report, available at the network node to assist in the transformation of UL information.

Before describing in detail exemplary embodiments, it is noted that the embodiments reside primarily in combinations of apparatus components and processing steps related to using channel state information for downlink configuration in Frequency Division Duplex (FDD) systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A channel may generally be a logical or physical channel. A channel may comprise and/or be arranged on one or more carriers, in particular a plurality of subcarriers. A wireless communication network may comprise at least one network node, in particular a network node as described herein. A terminal connected or communicating with a network may be considered to be connected or communicating with at least one network node, in particular any one of the network nodes described herein.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for using channel state information for downlink configuration in Frequency Division Duplex (FDD) system that may lack channel reciprocity between UL and DL channels/transmissions.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB (i.e., type of network node 16) for LTE/E-UTRAN and a gNB (i.e., another type of network node 16) for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a codebook unit 32 which is configured to perform one or more network node functions such as with respect to the using control information for downlink configuration in Frequency Division Duplex (FDD) system. A wireless device 22 is configured to include a reporting unit 34 which is configured to perform one or more wireless device 22 functions such as with respect to wireless communications in Frequency Division Duplex (FDD) systems.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, determine, transmit, receive, forward, relay, etc. information related to using channel state information for downlink configuration in Frequency Division Duplex (FDD) system.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include codebook unit 32 configured to perform one or more network node functions such as with respect to using channel state information for downlink configuration in Frequency Division Duplex (FDD) system.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a reporting unit 34 configured to perform one or more wireless device functions as described herein such as one or more functions related to communicating in Frequency Division Duplex (FDD) systems.

Figure 2:
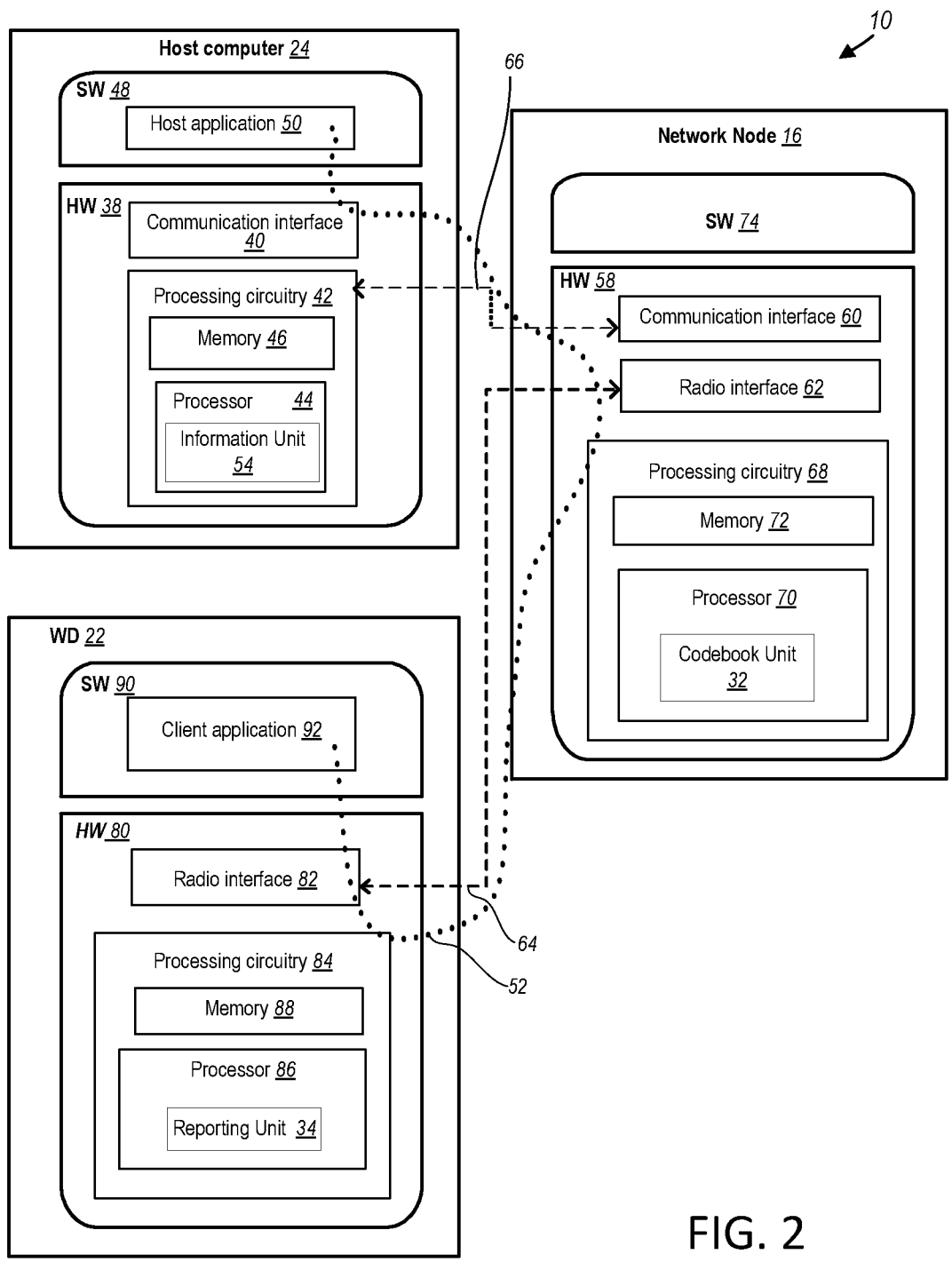
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as codebook unit 32, and reporting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
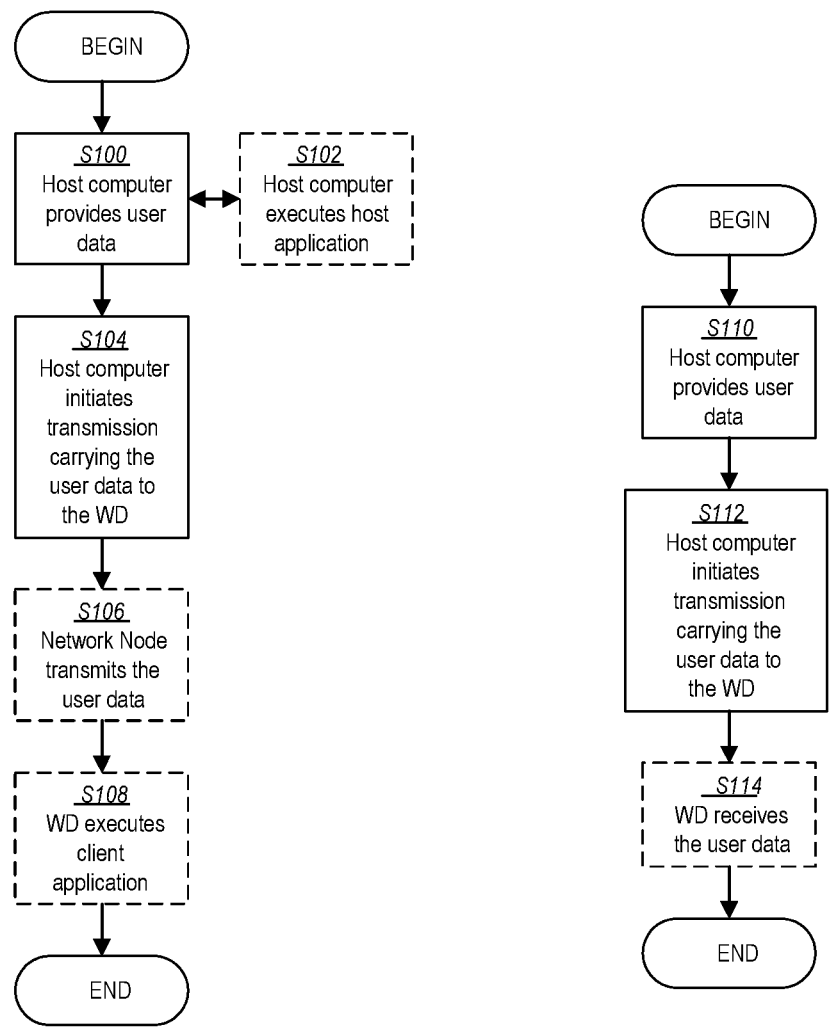
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

For simplicity, in one or more embodiments, it is assumed that the DFT codebook size of the PMI set is equal to a one-dimensional DFT beam set at the network node 16. In one or more embodiments where the DFT codebook size of the PMI set is not equal to the one-dimensional DFT beam set, there may be an additional step to translate the PMI index to the nearest DFT beam in a set with the size equal to the beam set.

Let $W_{PMI}$ represent the reported codebook that is reported to the network node 16 from wireless device 22 where $W_{PMI}$ is based at least in part on DL reference signal(s), i.e., measurements of one or more DL reference signals by wireless device 22. The reported codebook includes and/or indicates information about the best beamformer toward the wireless device 22 in horizontal direction, i.e., the best beamformer for downlink communication. The network node 16 can also determine the best beamformer from the estimates of the UL channel/signals. However, as discussed above, since there is a duplex gap in FDD systems, the two beamformers are not the same and a matrix, i.e., transformation matrix, that transforms the beam/beamformer from the UL to the DL and that also compensates for the duplex gap in FDD systems is determined. The network node 16 may determine this transformation matrix by using the reported codebook, i.e., DL reported codebook, from the wireless device 22 and the estimated UL codebook. Then this transformation matrix may be used for various purposes in various situations such as those described herein.

Let $W_{UL}$ represent the estimated beam at network node 16 from UL measurements such as UL measurements in the same subframe as the reported codebook. In one or more embodiments, the transformation matrix, T, at least in part minimizes the error between these two beams and/or beamformers, i.e., between $W_{UL}$ and $W_{PMI}$. In other words:

$$\min \| T \cdot M_{UL} - W_{PMI} \|_F^2$$

Solving for T using a minimum mean squire error process, the transformation matrix is $$T = \frac{W_{PMI} W_{UL}^H}{W_{UL} W_{UL}^H}$$

where $(.)^H$ is the Hermitian of a matrix. Once T is determined, the network node 16 can compensate the duplex gap between UL and DL directions and utilize the UL information in the DL direction. Several examples of such utilization are described below.

Figure 7:
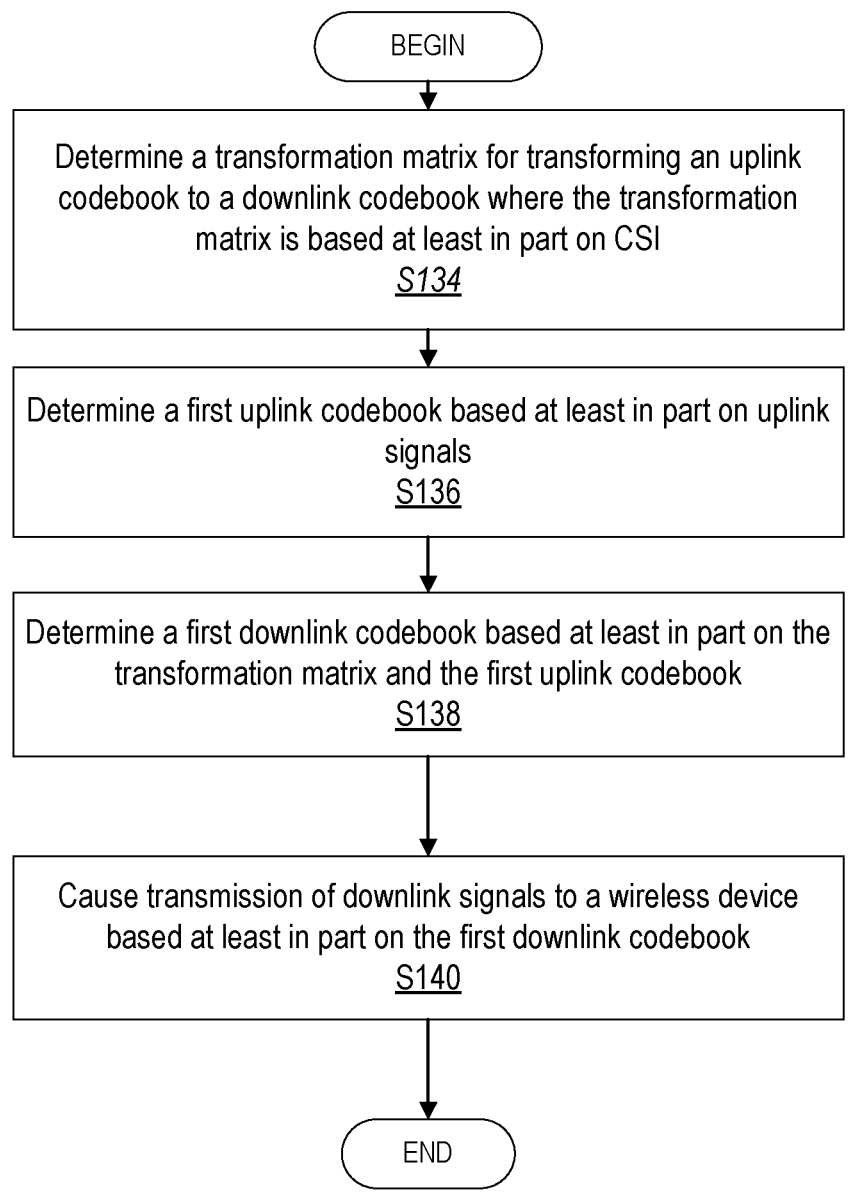
FIG. 7 is a flowchart of an exemplary process in a network node according to some embodiments of the present disclosure.

FIG. 7 is a flowchart of an exemplary process in a network node 16 for using reported channel state information such as Precoding Matrix Indicator (PMI) information, for example, for downlink transmissions in FDD systems. One or more Blocks and/or functions performed by network node 16 may be performed by one or more elements of network node 16 such as by codebook unit 32 in processing circuitry 68, processor 70, radio interface 62, etc. In one or more embodiments, network node 16 such as via one or more of processing circuitry 68, codebook unit 32, processor 70, communication interface 60 and radio interface 62 is configured to determine (Block S134) a transformation matrix for transforming an uplink codebook to a downlink codebook where the transformation matrix is based at least in part on channel state information, CSI such as, for example, PMI information. In one or more embodiments, network node 16 such as via one or more of processing circuitry 68, processor 70, codebook unit 32, communication interface 60 and radio interface 62 is configured to determine (Block S136) a first uplink codebook based at least in part on uplink signals. In one or more embodiments, network node 16 such as via one or more of processing circuitry 68, processor 70, codebook unit 32, communication interface 60 and radio interface 62 is configured to determine (Block S138) a first downlink codebook based at least in part on the transformation matrix and the first uplink codebook. In one or more embodiments, network node 16 such as via one or more of processing circuitry 68, processor 70, communication interface 60 and radio interface 62 is configured to cause (Block S140) transmission of downlink signals to a wireless device 22 based at least in part on the first downlink codebook.

In one or more embodiments, the CSI includes a second downlink codebook indicative of a downlink channel measured by a wireless device 22. In one or more embodiments, the processing circuitry 68 is further configured to determine a multi-dimensional downlink precoder based at least in part on the second downlink codebook included in the CSI and the first downlink codebook where the transmission of downlink signals to the wireless device is based at least in part on the multi-dimensional downlink precoder.

In one or more embodiments, the processing circuitry 68 is further configured to determine a second uplink codebook based at least in part on the uplink signals where the first uplink codebook corresponds to a first beam direction and the second uplink codebook corresponds to a second beam direction different from the first beam direction. The transformation matrix is based at least in part on the second uplink codebook. In one or more embodiments, the transformation matrix at least in part compensates for a duplex gap between an uplink channel and a downlink channel in the FDD wireless communication network. In one or more embodiments, the causing of transmission of downlink signals to the wireless device 22 includes performing, such as by processing circuitry 68 and/or radio interface 62, downlink beamforming based at least in part on the first downlink codebook.

Figure 8:
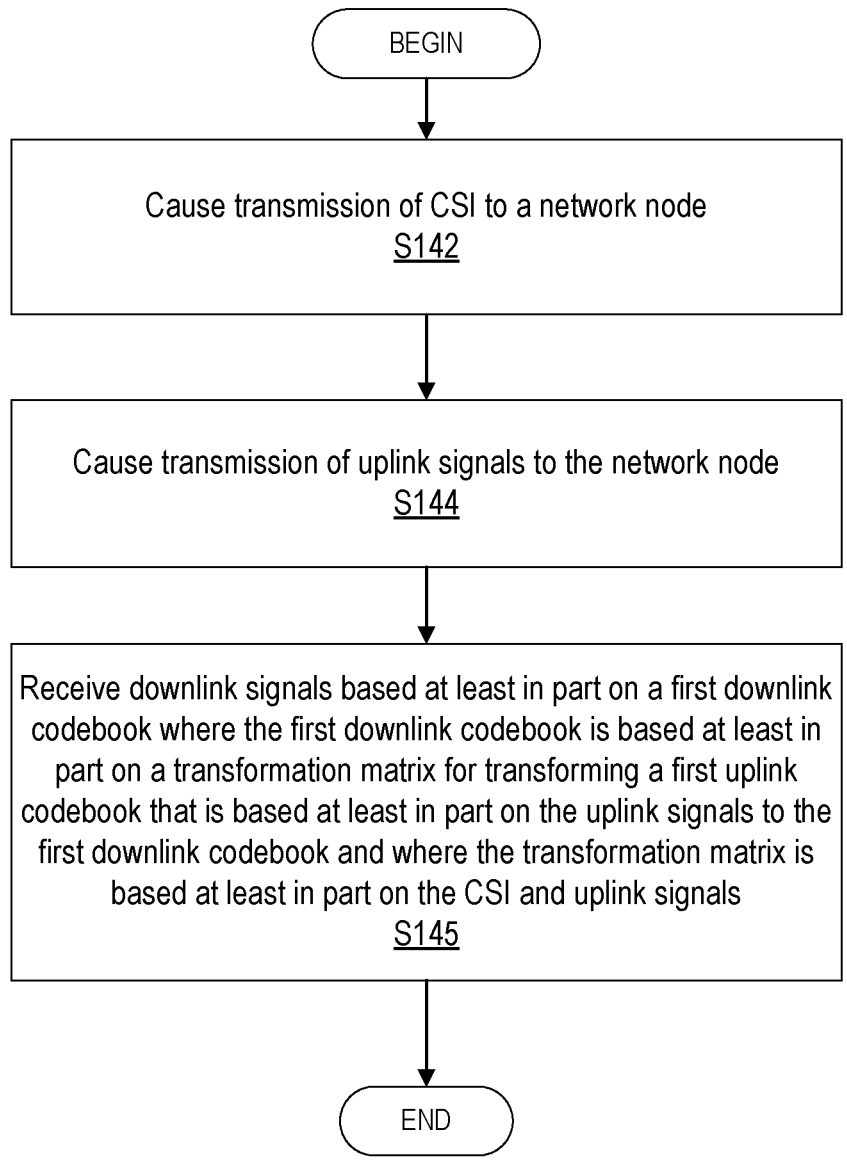
FIG. 8 is a flowchart of an exemplary process in a wireless device according to some embodiments of the present disclosure.

FIG. 8 is a flowchart of an exemplary process in a wireless device 22 for assisting the network node 16 in downlink transmissions in FDD systems. One or more Blocks and/or functions performed by wireless device 22 may be performed by one or more elements of wireless device 22 such as by reporting unit 34 in processing circuitry 84, processor 86, radio interface 82, etc. In one or more embodiments, wireless device such as via one or more of processing circuitry 84, processor 86, reporting unit 34, and radio interface 82 is configured to cause (Block S142) transmission of channel state information, CSI, to a network node 16. In one or more embodiments, wireless device such as via one or more of processing circuitry 84, processor 86 and radio interface 82 is configured to cause (Block S144) transmission of uplink signals to the network node 16. In one or more embodiments, wireless device such as via one or more of processing circuitry 84, reporting unit 34, processor 86 and radio interface 82 is configured to receive (Block S145) downlink signals based at least in part on a first downlink codebook where the first downlink codebook is based at least in part on a transformation matrix for transforming a first uplink codebook that is based at least in part on the uplink signals to the first downlink codebook. In one or more embodiments, the transformation matrix is based at least in part on the CSI and uplink signals.

In one or more embodiments, the processing circuitry 84 and/or reporting unit 34 is further configured to: measure downlink signals, and determine a second downlink codebook based at least in part on the measured downlink signals where the CSI indicates the second downlink codebook. In one or more embodiments, the downlink signals are based at least in part on a multi-dimensional downlink precoder that is based at least in part on the second downlink codebook included in the CSI and the first downlink codebook. In one or more embodiments, the first uplink codebook corresponds to a first beam direction and the second downlink codebook corresponds to a second beam direction different from the first beam direction. In one or more embodiments, the transformation matrix at least in part compensates for a duplex gap between an uplink channel and a downlink channel in the FDD wireless communication network. In one or more embodiment, the downlink signals are beamformed based at least in part on the first downlink codebook.

Figure 9:
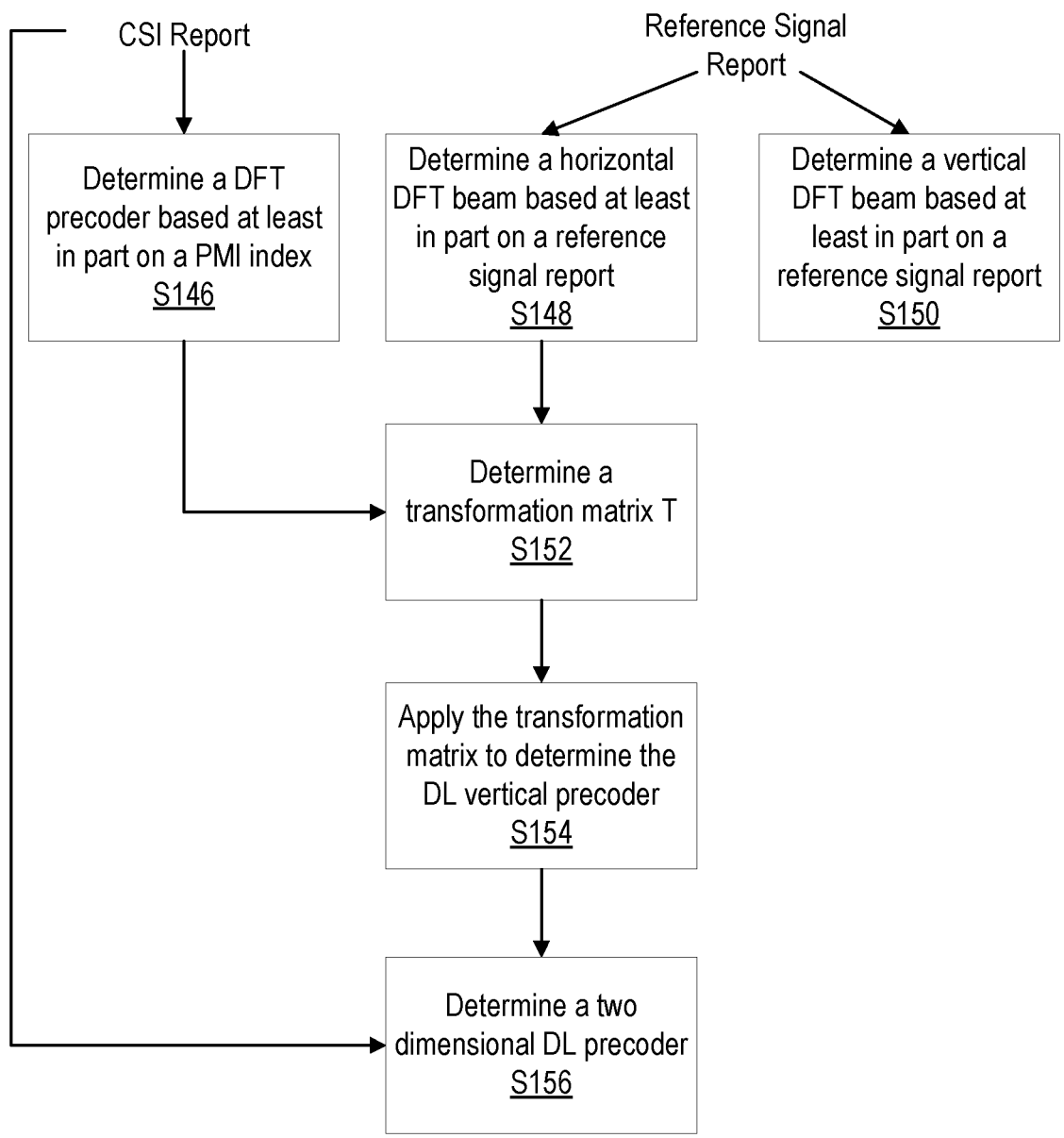
FIG. 9 is a flowchart of another exemplary process in a network node according to some embodiments of the present disclosure.

FIG. 9 is a flowchart of another process in a network node 16 for using channel state information for downlink configuration in Frequency Division Duplex (FDD) system according to some embodiments of the present disclosure. One or more Blocks and/or functions performed by network node 16 may be performed by one or more elements of network node 16 such as by codebook unit 32 in processing circuitry 68, processor 70, radio interface 62, and communication interface 60, etc. In one or more embodiments, network node 16 such as via one or more of processing circuitry 68, processor 70, codebook unit 32, communication interface 60 and radio interface 62 is configured to determine (Block S146) a DFT precoder $W_{PMI}$ based at least in part on a PMI index, as described herein. For example, the PMI index may be indicated and/or included in a CSI report (i.e., part of CSI) received at the network node 16. In one or more embodiment the CSI report is based at least in part on downlink measurements performed by the wireless device 22.

In one or more embodiments, network node 16 such as via one or more of processing circuitry 68, processor 70, codebook unit 32, communication interface 60 and radio interface 62 is configured to determine (Block S148) a horizontal DFT beam $W_h$, i.e., best horizontal beam, based at least in part on a reference signal report, as described herein. In one or more embodiments, a best horizontal beam may refer to a beam which is closest to a direction of received signals from the wireless device 22 in the horizontal domain. In one or more embodiments, a best vertical beam may refer to a beam that is closest to the received beam direction in a vertical domain. In one or more embodiments, the reference signal report is a DMRS or SRS report. In one or more embodiments, the reference signal report is generated by the network node 16 based at least in part on uplink measurements performed by the network node 16. In one or more embodiments, network node 16 such as via one or more of processing circuitry 68, processor 70, codebook unit 34, communication interface 60 and radio interface 62 is configured to determine (Block S150) a vertical DFT beam $\tilde{W}_v$, i.e., best beam and/or a first UL codebook, based at least in part on a reference signal report, as described herein. In one or more embodiments, the reference signal report is a DMRS or SRS report. In one or more embodiments, the reference signal report is generated by the network node 16 based at least in part on uplink measurements performed by the network node 16. In one or more embodiments, Blocks S148 and S150 are performed using the same reference signal report.

In one or more embodiments, network node 16 such as via one or more of processing circuitry 68, processor 70, codebook unit 32, communication interface 60 and radio interface 62 is configured to determine (Block S152) a transform matrix T ("transformation matrix"), as described herein. In one or more embodiments, the transformation matrix is determined based at least in part on at least one of the horizontal DFT beam and the DFT precoder. In one or more embodiments, the transformation matrix is defined as follows:

$$T = \frac{W_{PMI} W_h^H}{W_h W_h^H}$$

where $W_{PMI}$ is a codebook based at least in part on downlink reference signals, $W_{UL}$ is an estimated beam based at least in part on uplink signals, and $W_{UL}$ is a Hermitian of a matrix of $W_{UL}$. In one or more embodiments, network node 16 such as via one or more of processing circuitry 68, processor 70, codebook unit 32, communication interface 60 and radio interface 62 is configured to apply (Block S154) the transformation matrix to determine the DL vertical precoder $W_v$, i.e., a first DL codebook. In one or more embodiments, the transformation matrix is applied as follows $W_v = T \cdot \tilde{W}_v$. In one or more embodiments, the transformation matrix transforms the best vertical DFT beam $\tilde{W}_v$ to a DL vertical precoder $W_v$. In one or more embodiments, applying the transformation matrix at least in part compensates for the duplex gap in FDD systems such that UL information may be used to assist in determining the downlink precoder for downlink transmission.

In one or more embodiments, network node 16 such as via one or more of processing circuitry 68, processor 70, codebook unit 32, communication interface 60 and radio interface 62 is configured to determine (Block S156) a two dimensional DL precoder $W_{2D}$. In one or more embodiments, the two dimensional precoder $W_{2D}$ is defined as follows $W_{2D} = W_{PMI} \otimes W_v$. In one or more embodiments, a multi-dimensional downlink precoder such as the dimensional precoder is based at least in part on second downlink codebook such as the DFT precoder $W_{PMI}$ included in the CSI and a first downlink codebook such as the DL vertical precoder $W_v$. In one or more embodiments, both Blocks S146 and S156 use information from the CSI report. While FIG. 9 is described with respect to horizontal and vertical directions in a two dimensional antenna array, the teachings described herein are applicable other dimensional antenna arrays and one or more different directions.

Figure 10:
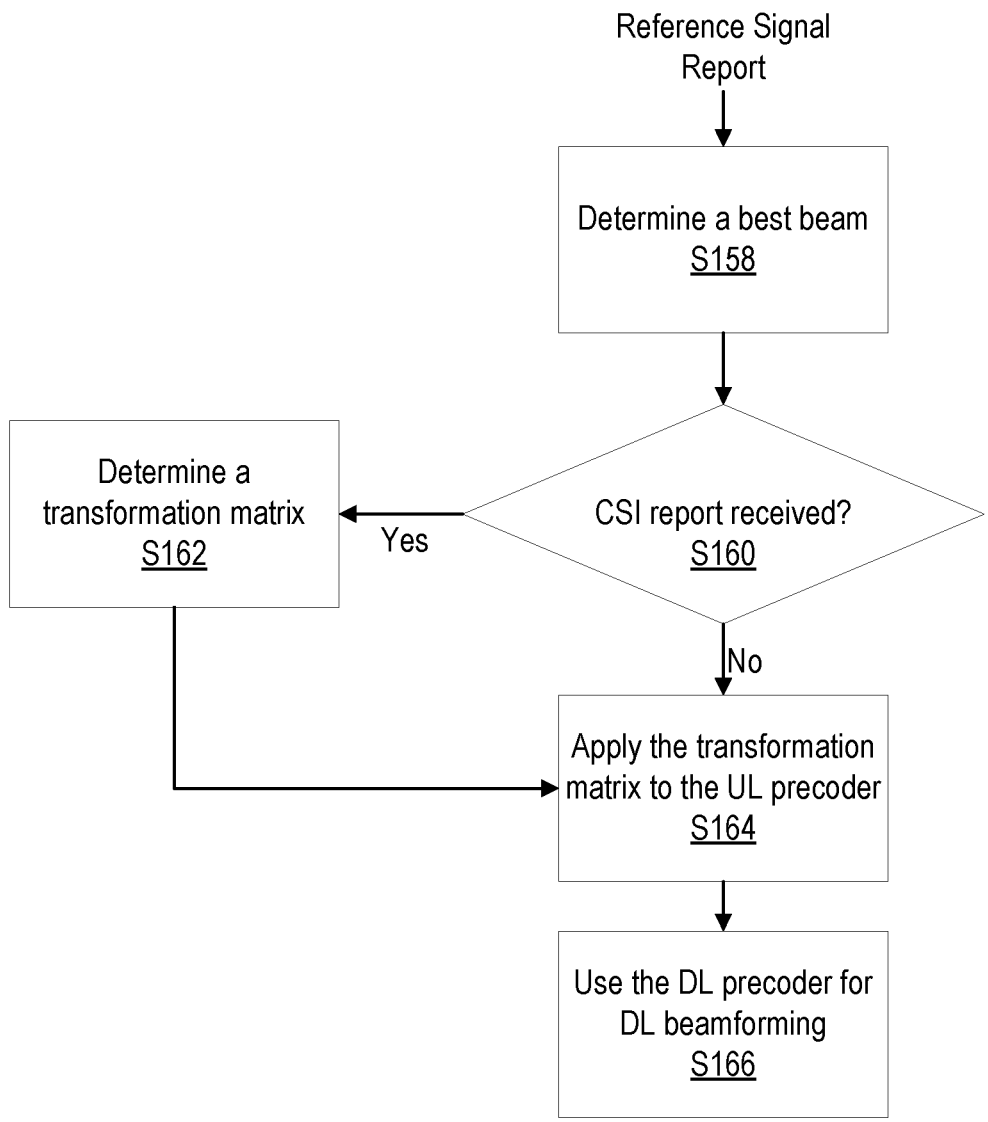
FIG. 10 is a flowchart of yet another exemplary process in a network node according to some embodiments of the present disclosure.

FIG. 10 is a flowchart of another process in a network node 16 for using channel state information for downlink configuration in Frequency Division Duplex (FDD) system according to some embodiments of the present disclosure. One or more Blocks and/or functions performed by network node 16 may be performed by one or more elements of network node 16 such as by codebook unit 32 in processing circuitry 68, processor 70, radio interface 62, and communication interface 60, etc. In one or more embodiments, network node 16 such as via one or more of processing circuitry 68, processor 70, codebook unit 32, communication interface 60 and radio interface 62 is configured to determine (Block S158) a best beam $\tilde{W}$. In one or more embodiments, the best beam $\tilde{W}$ is determined based at least in part on a reference signal report such as a DMRS or SRS report, for example. In one or more embodiments, the best beam $\tilde{W}$ is determined based at least in part on one or more measurements of one or more reference signals such as a Demodulation Reference Signal (DMRS) and/or Sounding Reference Signal (SRS). In one or more embodiments, network node 16 such as via one or more of processing circuitry 68, processor 70, communication interface 60 and radio interface 62 is configured to determine (Block S160) whether a CSI report was received. In one or more embodiments, the CSI report may include or indicate the DFT precoder $W_{PMI}$. In one or more embodiments, the best beam estimates are based at least in part on UL measurements may be performed by the network node 16 in every transmission time interval (TTI). In one or more embodiments, the CSI report may not be transmitted to the network node 16 every TTI such that receiving a CSI report may lead to the determination and updating of the transformation matrix as described herein, while the absence of a CSI report may cause the network node 16 to use a previously determined transformation matrix, as described herein.

In one or more embodiments, network node 16 such as via one or more of processing circuitry 68, processor 70, communication interface 60 and radio interface 62 is configured to, if the CSI report is determined to have been received, determine (Block S162) the transformation matrix. In one or more embodiments, if a previous transformation matrix had been determined and stored in memory 72, this previous transformation matrix is replaced or updated based on the determination of Block S162. In other words, in one or more embodiments, the transformation matrix may be updated based on whether the CSI report is received by the network node 16. In one or more embodiments, network node 16 such as via one or more of processing circuitry 68, processor 70, codebook unit 32, communication interface 60 and radio interface 62 is configured to apply (Block S164) the transformation matrix to the UL precoder, i.e., to best beam $\tilde{W}$. For example, in one or more embodiments, applying transformation matrix T to the UL precoder results in a DL precoder W where this applying of transformation matrix is as follows $W = T \cdot \tilde{W}$.

Referring back to Block S160, in one or more embodiments, network node 16 such as via one or more of processing circuitry 68, processor 70, communication interface 60 and radio interface 62 is configured to, if the CSI report is determined to have not been received, apply (Block S164) the transformation matrix to the UL precoder, i.e., to best beam $\tilde{W}$, where the transformation matrix is based at least in part on a previously received CSI report. In one or more embodiments, network node 16 such as via one or more of processing circuitry 68, codebook unit 32, processor 70, communication interface 60 and radio interface 62 is configured to use (Block S166) the DL precoder W for DL beamforming.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
AoA Angle of Arrivals
AoD Angle of Departures
CSI Channel State Information
CSI-RS Channel State Information-Reference Signal
DFT Discrete Fourier Transformation
DL DownLink
DMRS Demodulation Reference Signal
FDD Frequency Division Duplex
MMSE Minimum Mean Square Error
MVDR Minimum Variance Distortion-less Response
PMI Precoding Matrix Indicator
SRS Sounding Reference Signal
UL UpLink As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for a Frequency Division Duplex, FDD, wireless communication network, the network node comprising processing circuitry configured to:
- determine a transformation matrix for transforming an uplink codebook to a downlink codebook, the transformation matrix being based at least in part on channel state information, CSI, the transformation matrix at least in part compensating for a duplex gap between an uplink channel and a downlink channel in the FDD wireless communication network;
- determine a first uplink codebook based at least in part on uplink signals;
- determine a first downlink codebook based at least in part on the transformation matrix and the first uplink codebook; and
- cause transmission of downlink signals to a wireless device based at least in part on the first downlink codebook.

2. The network node of claim 1, wherein the CSI includes a second downlink codebook indicative of a downlink channel measured by a wireless device.

3. The network node of claim 2, wherein the processing circuitry is further configured to determine a multi-dimensional downlink precoder based at least in part on the second downlink codebook included in the CSI and the first downlink codebook; and
- the transmission of downlink signals to the wireless device being based at least in part on the multi-dimensional downlink precoder.

4. The network node of claim 1, wherein the processing circuitry is further configured to determine a second uplink codebook based at least in part on the uplink signals, the first uplink codebook corresponding to a first beam direction and the second uplink codebook corresponding to a second beam direction different from the first beam direction; and
- the transformation matrix being based at least in part on the second uplink codebook.

5. The network node of claim 1, wherein the causing of transmission of downlink signals to the wireless device includes performing downlink beamforming based at least in part on the first downlink codebook.

6. The network node of claim 1, wherein the CSI includes a precoding matrix indicator, PMI, the determination of the transformation matrix being based at least in part on the PMI.

7. The network node of claim 6, wherein the PMI in a first beam direction is used for determining the first downlink codebook in a second beam direction different from the first beam direction.

8. The network node of claim 1, wherein the transformation matrix is defined as:

$$T = \frac{W_{PMI} W_{UL}^H}{W_{UL} W_{UL}^H}$$

where $W_{PMI}$ is a codebook based at least in part on downlink reference signals, $W_{UL}$ is an estimated beam based at least in part on uplink signals, and $W_{UL}^H$ is a Hermitian of a matrix of $W_{UL}$.

9. The network node of claim 1, wherein the transformation matrix is updated if a precoding matrix indicator, PMI, is included in the CSI.

10. A method for a network node for a Frequency Division Duplex, FDD, wireless communication network, the method comprising:
- determining a transformation matrix for transforming an uplink codebook to a downlink codebook, the transformation matrix being based at least in part on channel state information, CSI, the transformation matrix at least in part compensating for a duplex gap between an uplink channel and a downlink channel in the FDD wireless communication network;
- determining a first uplink codebook based at least in part on uplink signals;
- determining a first downlink codebook based at least in part on the transformation matrix and the first uplink codebook; and
- causing transmission of downlink signals to a wireless device based at least in part on the first downlink codebook.

11. The method of claim 10, wherein the CSI includes a second downlink codebook indicative of a downlink channel measured by a wireless device.

12. The method of claim 11, further comprising determining a multi-dimensional downlink precoder based at least in part on the second downlink codebook included in the CSI and the first downlink codebook; and
- the transmission of downlink signals to the wireless device being based at least in part on the multi-dimensional downlink precoder.

13. The method of claim 10, further comprising determining a second uplink codebook based at least in part on the uplink signals, the first uplink codebook corresponding to a first beam direction and the second uplink codebook corresponding to a second beam direction different from the first beam direction; and
- the transformation matrix being based at least in part on the second uplink codebook.

14. The method of claim 10, wherein the causing of transmission of downlink signals to the wireless device includes performing downlink beamforming based at least in part on the first downlink codebook.

15. The method of claim 10, wherein the CSI includes a precoding matrix indicator, PMI, the determination of the transformation matrix being based at least in part on the PMI.

16. The method of claim 15, wherein the PMI in a first beam direction is used for determining the first downlink codebook in a second beam direction different from the first beam direction.

17. The method of claim 10, wherein the transformation matrix is defined as $$T = \frac{W_{PMI} W_{UL}^H}{W_{UL} W_{UL}^H}$$

where $W_{PMI}$ is a codebook based at least in part on downlink reference signals, $W_{UL}$ is an estimated beam based at least in part on uplink signals, and $W_{UL}^H$ is a Hermitian of a matrix of $W_{UL}$.

18. The method of claim 10, wherein the transformation matrix is updated if a precoding matrix indicator, PMI, is included in the CSI.

* * * * *